(12) United States Patent
Lee

(10) Patent No.: US 8,766,596 B2
(45) Date of Patent: Jul. 1, 2014

(54) BATTERY MANAGEMENT SYSTEM AND BATTERY MANAGEMENT METHOD

(75) Inventor: Ming-Hsien Lee, Hsinchu (TW)

(73) Assignee: Energy Pass Incorporation, Hsinchu Science Park, Hsinchu (TW)

( * ) Notice: Subject to any disclaimer, the term of this patent is extended or adjusted under 35 U.S.C. 154(b) by 365 days.

(21) Appl. No.: 13/225,560

(22) Filed: Sep. 6, 2011

(65) Prior Publication Data

US 2013/0057223 A1 Mar. 7, 2013

(51) Int. Cl.
*H01M 10/44* (2006.01)
*H01M 10/46* (2006.01)

(52) U.S. Cl.
USPC ......................................... 320/116; 320/132

(58) Field of Classification Search
USPC ......... 320/107, 116, 118, 119, 120, 132, 134, 320/136, 149, 137
See application file for complete search history.

(56) References Cited

U.S. PATENT DOCUMENTS

| | | | |
|---|---|---|---|
| 2005/0285566 A1* | 12/2005 | Furukawa et al. | 320/116 |
| 2011/0089898 A1* | 4/2011 | Lee et al. | 320/116 |
| 2011/0254508 A1* | 10/2011 | Sakakibara | 320/118 |

* cited by examiner

*Primary Examiner* — Edward Tso
(74) *Attorney, Agent, or Firm* — Winston Hsu; Scott Margo

(57) ABSTRACT

A battery management system (BMS) for managing discharging of a plurality of battery cells is disclosed. The battery management system comprises a battery monitoring unit, for monitoring statuses of the plurality of battery cells; and a discharge control unit, for controlling the plurality of battery cells to output a plurality of output powers to a load according to the statuses of the plurality of battery cells.

16 Claims, 5 Drawing Sheets

BATTERY MANAGEMENT SYSTEM AND BATTERY MANAGEMENT METHOD

BACKGROUND OF THE INVENTION

1. Field of the Invention

The present invention relates to a battery management system (BMS) and a battery management method, and more particularly, to a battery management system and a battery management method capable of managing charging and discharging of each of a plurality of battery cells according to individual statuses of the cells.

2. Description of the Prior Art

Generally, a battery is required to undergo a sorting process before packaging and leaving a manufacturing plant. This is due to old and new batteries (i.e. batteries having different statuses) cannot be mixed in use. A mixed use of batteries leads to an imbalanced distribution of power, where weaker batteries are forced to output a higher power and depletes faster than newer batteries.

Sorting the batteries into groups of similar statuses would help alleviate this imbalance and allow cells to deplete at similar rates. Older batteries are usually characterized by having higher internal resistances. When connected serially in a current loop with other batteries, older batteries having higher internal resistances tend to output a relatively higher power ($P=I^2R$, wherein a current I is same for each element in the current loop, and R is the internal resistance of a battery cell). In contrast, healthier cells having lower internal resistances are required to output lower power. Also, a higher output power means a higher operating temperature, and thus a danger of thermal runaway. Both factors speed up the widening of status differences between the cells, as well as accelerate the deterioration of weaker batteries toward depletion, at which point the entire current loop would be cut off. Smaller devices such as notebook computers utilize smaller battery packs (e.g. 6-cell); however, for higher-power applications (e.g. electric vehicles) which often have battery packs with hundreds of cells, it can be extremely costly to have to replace a whole battery pack when only one cell is dead.

However, this sorting can be difficult, as batteries usually exhibit only subtle status differences before leaving the plant. It is not only until certain amount of usage that the imbalances and discrepancies between batteries begin to emerge (a non-linear and accelerating process, as mentioned above). This difficulty in sorting is exacerbated by the fact that in applications that require outputting large instantaneous currents such as electric vehicles (e.g. for cruising sloped environments), batteries are required to have extremely low internal resistances and a high C rate (a.k.a. hourly rate), for example, LiMPO4 (Lithium iron phosphate) batteries. This means that initial status differences between batteries are even more subtle, rendering the sorting process impossible. Also, electric vehicles may utilize hundreds of cells, and attempting to obtain hundreds of cells having similar statuses during the sorting process is also a major challenge.

Thus, there is a need to improve over the prior art.

SUMMARY OF THE INVENTION

A battery management system (BMS) for managing discharging of a plurality of battery cells is disclosed. The BMS comprises a battery monitoring unit, for monitoring statuses of the plurality of battery cells; and a discharge control unit, for controlling the plurality of battery cells to output a plurality of output powers to a load according to the statuses of the plurality of battery cells.

A battery management method for managing discharging of a plurality of battery cells is disclosed. The battery management method comprises monitoring statuses of the plurality of battery cells; and controlling the plurality of battery cells to output a plurality of output powers to a load according to the statuses of the plurality of battery cells.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
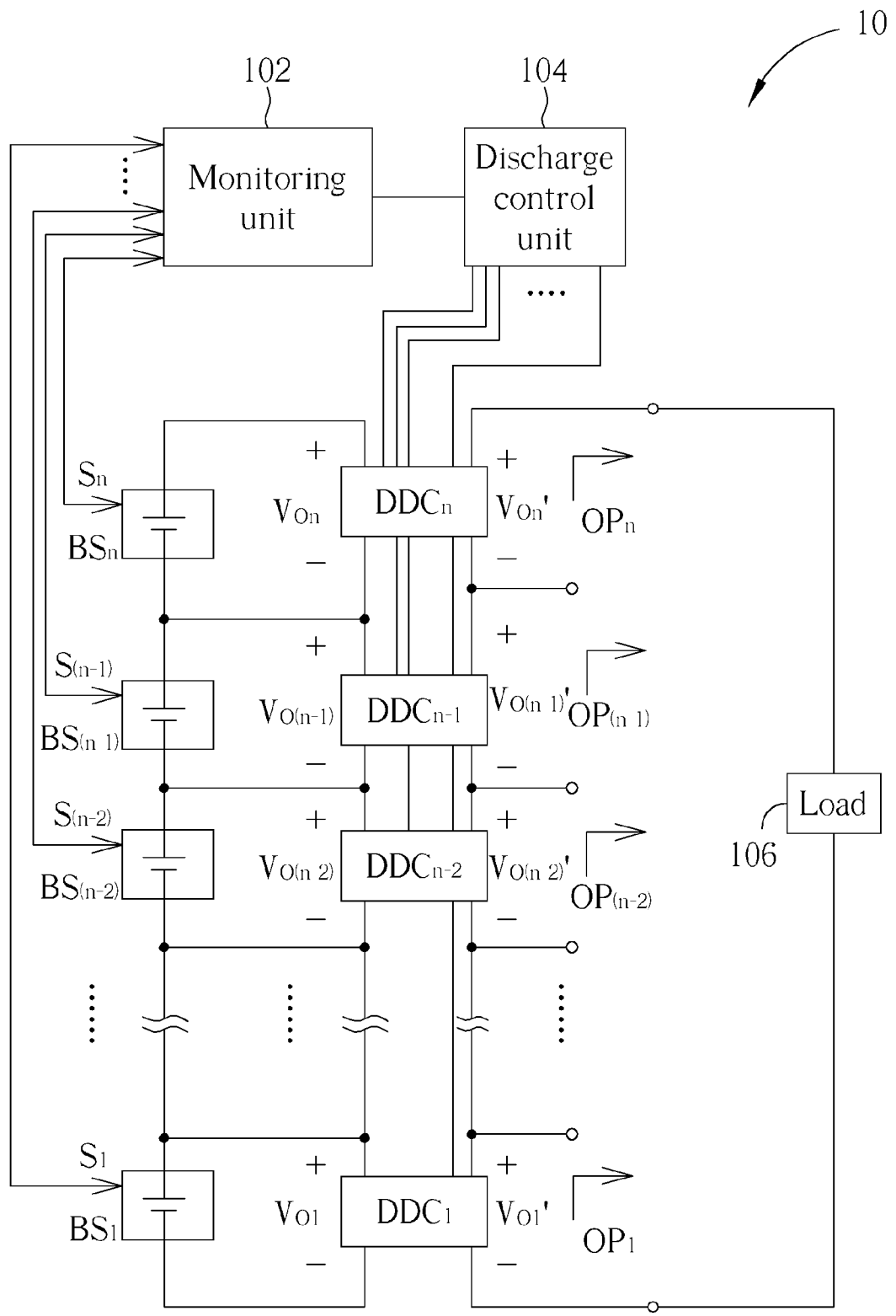
FIG. 1 is a schematic diagram of a battery management system according to an embodiment of the invention.

Please refer to FIG. 1, which is a schematic diagram of a battery management system (BMS) 10 according to an embodiment of the invention. The BMS 10 includes a plurality of serially connected battery cells BS1-BSn, a plurality of DC-DC convertors DDC1-DDCn, a monitoring unit 102, a discharge control unit 104, and a load 106. The BMS 10 can manage discharging of the battery cells BS1-BSn to provide output powers OP1-OPn to the load 106, respectively. The battery cells BS1-BSn have output voltages Vo1-Von. The DC-DC convertors DDC1-DDCn are coupled to each of the battery cells BS1-BSn, respectively, and can be controlled to modify levels of the output voltages Vo1-Von and generate modified output voltages Vo1'-Von'. The monitoring unit 102 monitors statuses S1-Sn of the battery cells BS1-BSn, respectively. The statuses S1-Sn include State of Charge (SOC) and/or State of Health (SOH) of the battery cells BS1-BSn. Finally, the discharge control unit 104 is coupled to the DC-DC convertors DDC1-DDCn, and can control the DC-DC convertors DDC1-DDCn to convert the output voltages Vo1-Von of the battery cells BS1-BSn to the modified output voltages Vo1'-Von', such that the battery cells BS1-BSn can output the corresponding output powers OP1-OPn to the load 106 according to the statuses S1-Sn. As a result, when batteries of different statuses are used together in the BMS 10, poorer cells do not deteriorate quickly and the difference between cells does not widen with usage, as in a conventional battery system without battery management. Instead, each cell is controlled to output power according to its status.

In detail, the discharge control unit 104 of the BMS 10 utilizes the DC-DC convertors DDC1-DDCn to control the battery cells BS1-BSn according to the statuses S1-Sn, such that weaker cells (e.g. older cells having higher internal resistances) can be allowed to output a lower output power, and healthier cells (e.g. new cells having lower internal resistances) to output a higher output power. When the monitoring unit 102 detects that a status Sx corresponding to a cell BSx is worse than a status Sy corresponding to a cell BSy, the discharge control unit 104 controls DC-DC convertors DDCx and DDCy to make an output voltage Vox' of the cell BSx lower than an output voltage Voy' of the cell BSy (i.e. make an output power OPx of the cell BSx lower than an output power OPy of the cell BSy). Conversely, if the monitoring unit 102 detects that the status Sx is better than the status Sy, the DC-to-DC convertors DDCx and DDCy make Vox' and OPx higher than Voy' and OPy, respectively. In this way, the battery cells BS1-BSn do not have to be sorted before use. Furthermore, the battery cells BS1-BSn can be expected to deteriorate at similar rates, with each cell outputting a suitable output power according to its status.

For example, suppose n=3, namely that the BMS 10 includes three serially connected battery cells BS1, BS2, and BS3. Suppose that during usage, actual output voltages Vo1, Vo2, and Vo3 of the battery cells BS1-BS3 are 3.59V, 3.60V, and 3.62V, respectively. The monitoring unit 102 detects statuses S1-S3 of the battery cells BS1-BS3. Since the status S1 of the cell BS1 is better than the status S2 of the cell BS2, the discharge control unit 104 controls DC-DC convertors DDC1 and DDC2 to adjust the output voltages Vo1 and Vo2, such that the cell BS1 outputs at a modified output voltage Vo1' higher than a modified output voltage V02' of the cell BS2 (i.e. adjust an output power OP1 of the cell BS1 to be higher than an output power OP2 of the cell BS2). Similarly, since the status S3 of the cell BS3 is worse than the status S2 of the cell BS2, the DC-DC convertors DDC3 and DDC2 adjust the output voltages Vo3 and Vo2, such that the cell BS3 outputs at a modified output voltage V03' lower than a modified output voltage V02' of the cell BS2 (i.e. adjust an output power OP3 of the cell BS1 to be lower than an output power OP2 of the cell BS2). As a result, the modified output voltages of the cells BS1-BS3 may be Vo1'=3.61V, Vo2'=3.60V Vo3'=3.59V. In this way, a relatively poor cell (e.g. BS3) can be allowed to output a relatively lower power, whereas a relatively healthy cell (e.g. BS1) can compensate by outputting a relatively higher output power.

Figure 3A:
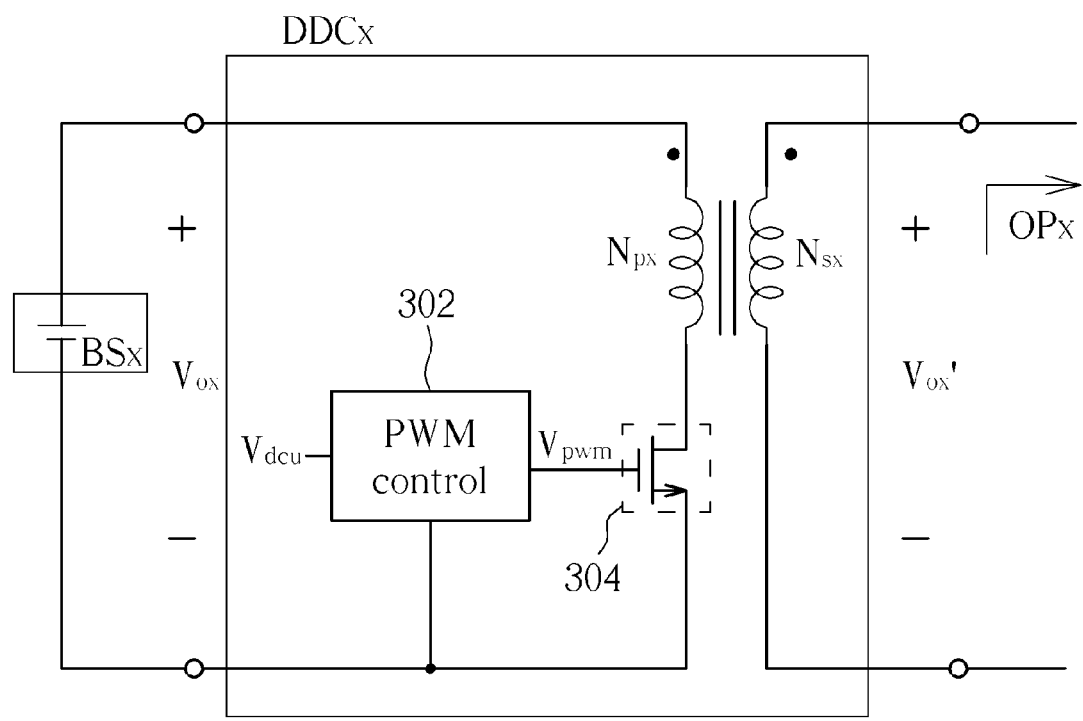
FIG. 3A is a schematic diagram of details of the battery management system shown in FIG. 1 according to an embodiment of the invention.

In more detail, please refer to FIG. 3A, which is a schematic diagram of details of the DC-DC convertor DDCx of the DC-DC convertors DDC1-DDCn shown in FIG. 1 according to an embodiment of the invention. The DC-DC convertor DDCx includes a pulse-width modulation (PWM) control unit 302, a transistor 304, a primary winding Npx, and a secondary winding Nsx. The PWM control unit 302 can generate a PWM control signal Vpwm to turn on or cut off the transistor 304 according to a discharge control signal Vdcu from the discharge control unit 104. When the transistor 304 is turned on by the PWM control signal Vpwm, electric power of the battery cell BSx is transferred from the primary winding Npx to the secondary winding Nsx. Therefore, by adjusting a duty cycle of the PWM control signal Vpwm, the PWM control unit 302 can control the conversion of the output voltage Vox to the modified output voltage Vox', and hence, the output power OPx. Detailed operations of pulse-width modulation are well known to those skilled in the art, and are not described here. More specifically, the PWM control unit 302 controls the duty cycle of the PWM control signal Vpwm according to the discharge control signal Vdcu, which is related to the status Sx corresponding to the battery cell BSx.

In another embodiment, the BMS 10 may also be utilized to manage charging of the battery cells BS1-BSn. Please refer to FIG. 2, which is a schematic diagram of a BMS 20 according to an embodiment of the invention, wherein elements with similar functions as those shown in FIG. 1 are denoted by same symbols. Compared with the BMS 10, the BMS 20 further includes an input source 202, a charge control unit 204, battery switches BSW1-BSWn, and input switches ISW1-ISWn. The input source 202 can provide an input power IP to charge the battery cells BS1-BSn. The charge control unit 204 controls the battery switches BSW1-BSWn, such that only battery cells that are not fully charged are charged by the input power IP. Furthermore, the charge control unit 204 controls the input switches ISW1-ISWn, such that only one input switch is turned on at any time, corresponding to a quantity of cells within the battery cells BS1-BSn that require charging.

Figure 2:
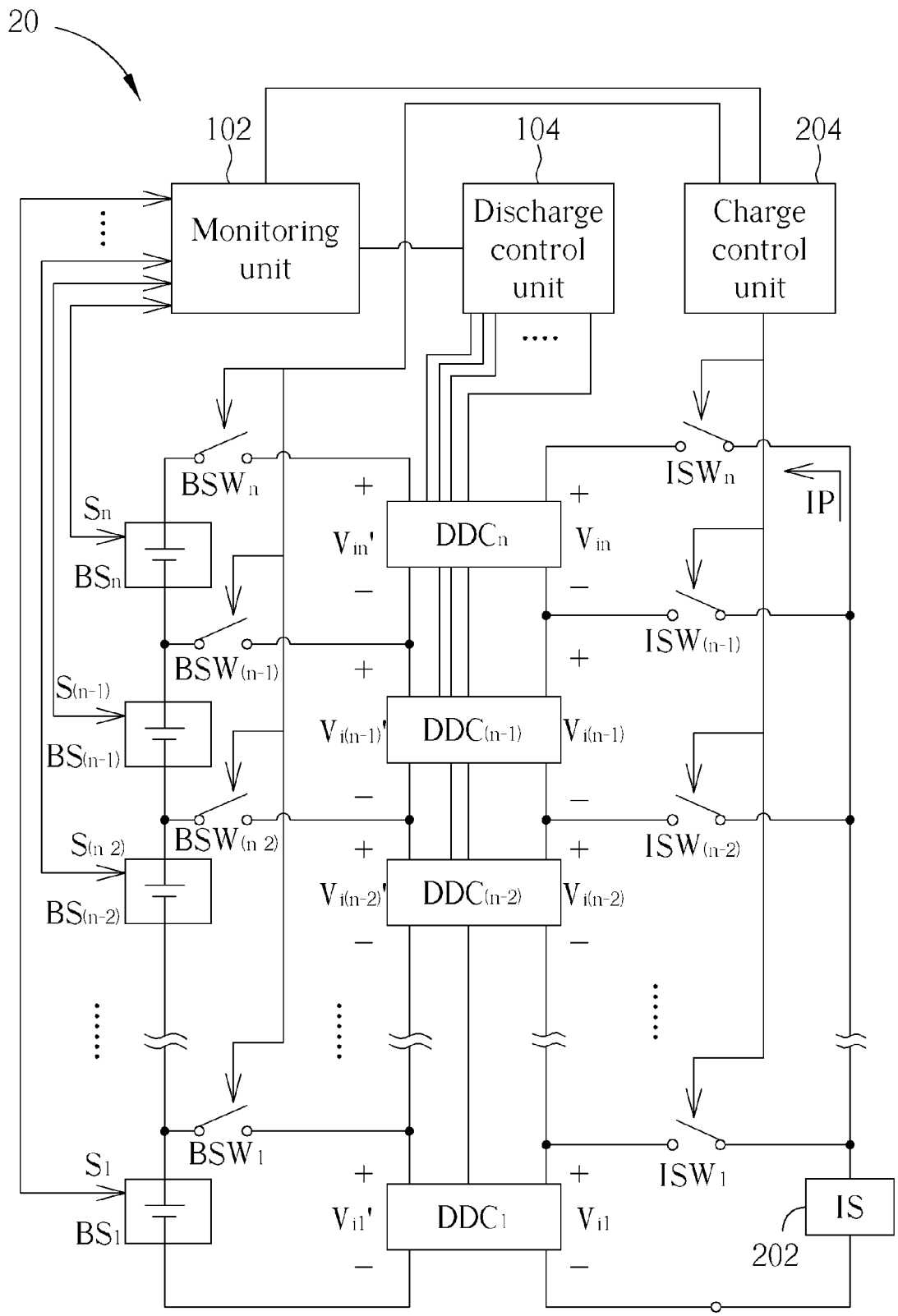
FIG. 2 is a schematic diagram of a battery management system according to an embodiment of the invention.
Figure 3B:
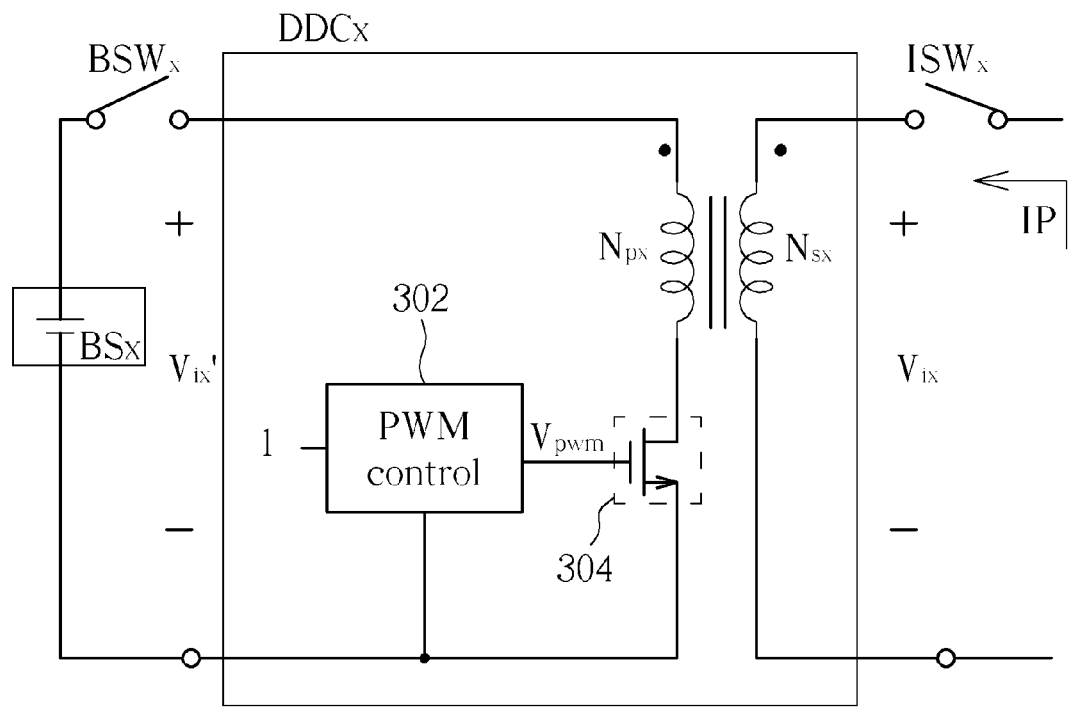
FIG. 3B is a schematic diagram of details of the battery management system shown in FIG. 2 according to an embodiment of the invention.

More specifically, please refer to FIG. 3B, which is a schematic diagram of details of the BMS 20 shown in FIG. 2 according to an embodiment of the invention, wherein elements with similar functions as those shown in FIG. 3A are denoted by same symbols. When the BMS 20 is charging, the monitoring unit 102 detects statuses S1-Sn of the battery cells BS1-BSn. If the status Sx of the battery cell BSx indicates that the cell BSx is fully charged, the charge control unit 204 cuts off the battery switch BSWx, such that the cell BSx is not charged by the input power IP. All other remaining battery switches other than BSWx are still conducted, such that all battery cells other than the cell BSx continue to be charged by the input power IP.

Furthermore, when all n cells of the battery cells BS1-BSn require charging, the charge control unit 204 turns on the input switch ISWn only. As a result, all of the secondary coils Ns1-Nsn are used to transfer the input power IP to the primary coils to charge all n cells of the battery cells BS1-BSn (the secondary coils Ns1-Nsn of the battery cells BS1-BSn share a same common magnetic core). When the status Sy indicates that a battery cell BSy has finished charging, only (n−1) cells remain that require charging. Accordingly, the charge control unit 204 cuts off the battery switch BSWy, such that the cell BSy is not charged by the input power IP. Furthermore, the charge control unit 204 controls the input switches ISW1-ISWn such that only the input switch ISW (n−1) is turned on. As a result, only the secondary coils Ns1-Ns (n−1) (i.e. only (n−1) coils) are used to transfer the input power IP to the corresponding primary coils to charge the remaining (n−1) cells other than the cell BSy. Therefore, the charge control unit 204 ensures that the quantity of secondary coils used for charging always matches the quantity of battery cells that require to be charged.

Furthermore, during charging, the PWM control unit 302 controls the duty of the PWM control signal Vpwm to be 1, (i.e. the transistor 304 is always turned on). Therefore, during charging, the DC-DC convertors DDC1-DDCn do not perform conversion (i.e. Vix=Vix').

Notably, the spirit of the invention is to achieve battery management through monitoring individual statuses of each battery cell, so as to control charging/discharging of each cell according to its corresponding status. Suitable modifications and alterations may be made accordingly by those skilled in the art, not limited hereto. For example, the statuses S1-Sn include State of Charge (SOC) and/or State of Health (SOH) of the battery cells BS1-BSn, but may also include other indicators capable of reflecting different statuses of the battery cells BS1-BSn, e.g. internal resistance or temperature.

Furthermore, the embodiments above utilize the BMS 10, 20 to manage a plurality of serially connected battery cells, but it is also possible to apply the BMS 10, 20 to manage a plurality of battery cells connected in parallel. Also, the discharge control unit 104 in the above embodiment may alternatively control the battery cells BS1-BS3 to output the same power (i.e. OP1=OP2=OP3) by controlling the modified output voltages Vo1', Vo2', and Vo3' to be equal (i.e. Vo1'=Vo2'=Vo3'=3.60V), instead of controlling healthier cells to output a relatively higher power.

Finally, it should be noted that discharging management in BMS 10 and charging management in BMS 20 can be utilized separately in different battery management systems, or integrated into a single system.

Figure 4:
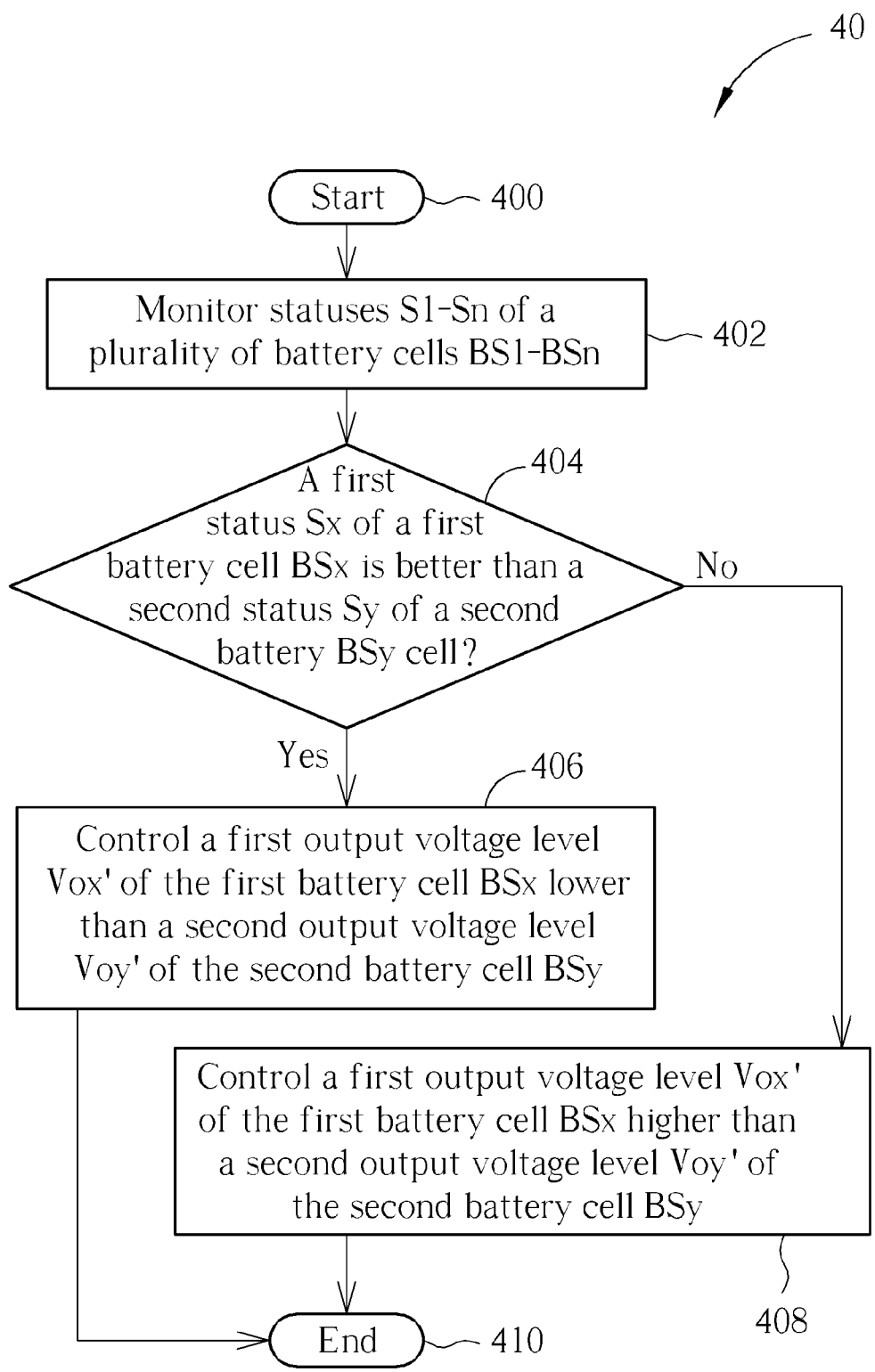
FIG. 4 is a schematic diagram of a process according to an embodiment of the invention.

The above-mentioned discharge management operations of the BMS 10 can be summarized into a battery management process 40, as shown in FIG. 4. The battery management process 40 includes the following steps:

Step 400: Start.

Step 402: Monitor statuses S1-Sn of a plurality of battery cells BS1-BSn.

Step 404: Compare a first status Sx of a first battery cell BSx and a second status Sy of a second battery BSy cell. If the first status Sx is worse than the second status Sy, go to Step 406; if the first status Sx is better than the second status Sy, go to Step 408.

Step 406: Control a first output voltage level Vox' of the first battery cell BSx lower than a second output voltage level Voy' of the second battery cell BSy. Go to Step 410.

Step 408: Control a first output voltage level Vox' of the first battery cell BSx higher than a second output voltage level Voy' of the second battery cell BSy. Go to Step 410.

Step 410: End.

Details of the battery management 40 can be derived by referring to the above corresponding descriptions, and are not narrated hereinafter.

In the prior art, batteries with no battery management have to be sorted before use. During use, weaker battery cells would be forced to output a higher output power and would thus deteriorate faster than healthier cells. In comparison, the battery management system of the invention monitors individual statuses of each battery cell, so as to control charging/discharging of each cell according to its corresponding status. As a result, when batteries of different statuses are mixed in use, poorer cells do not deteriorate quickly and the difference between cells does not widen with usage. Instead, each cell is controlled to output power according to its status.

In summary, the battery management system of the invention controls charging and discharging of a plurality of battery cells according to individual statuses of the cells, such that the battery cells do not have to be sorted before use, and all of the battery cells can be expected to deplete at a similar rate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A battery management system (BMS) for managing discharging of a plurality of battery cells, comprising:
   a battery monitoring unit, for monitoring statuses of the plurality of battery cells;
   a discharge control unit, for controlling the plurality of battery cells to output a plurality of output powers to a load according to the statuses of the plurality of battery cells; and
   a plurality of DC-to-DC convertors coupled to each of the plurality of battery cells, for modifying output voltage levels of the plurality of battery cells to generate the plurality of output powers;
   wherein each of the plurality of DC-to-DC convertors modifies corresponding one of the output voltage levels of corresponding one of the plurality of battery cells according to corresponding one of the statuses of the plurality of battery cells, to generate corresponding one of the plurality of output powers;
   wherein the discharge control unit controls a first DC-to-DC convertor corresponding to a first battery cell within the plurality of battery cells to control a first output voltage level of the first battery cell lower than a second output voltage level of a second battery cell when the battery monitoring unit indicates that a first status of the first battery cell is worse than a second status of the second battery cell, or the discharge control unit controls the first DC-to-DC convertor corresponding to the first battery cell within the plurality of battery cells to control the first output voltage level of the first battery cell higher than the second output voltage level of the second battery cell, when the battery monitoring unit indicates that the first status of the first battery cell is better than the second status of the second battery cell.

2. The BMS of claim 1, wherein the statuses of the plurality of battery cells comprise State of Charge (SOC) and State of Health (SOH) of the plurality of battery cells.

3. The BMS of claim 1 further used for managing charging of the plurality of battery cells, comprising:
   a charge control unit, for controlling connections between an input source and the plurality of battery cells to charge at least one battery cell within the plurality of battery cells with an input power according to the statuses of the plurality of battery cells.

4. The BMS of claim 3, wherein the charge control unit controls the input source to be connected to at least one first battery cell within the plurality of battery cells to charge the at least one first battery cell with the input power when at least one first status of the at least one first battery cell indicates that the at least one first battery cell is not fully charged.

5. The BMS of claim 3, wherein the charge control unit further controls the input source not to be connected to at least one second battery cell within the plurality of battery cells to not charge the at least one second battery cell with the input power when at least one second status of the at least one second battery cell indicates that the at least one second battery cell is fully charged.

6. The BMS of claim 1, wherein the plurality of DC-to-DC convertors modify the voltage levels of the plurality of battery cells through Pulse Width Modulation (PWM).

7. A battery management method, for managing discharging of a plurality of battery cells, comprising:
   monitoring statuses of the plurality of battery cells;
   controlling the plurality of battery cells to output a plurality of output powers to a load according to the statuses of the plurality of battery cells; and
   modifying output voltage levels of the plurality of battery cells to generate the plurality of output powers, to modify one of the output voltage levels of corresponding one of the plurality of battery cells according to corresponding one of the statuses of the plurality of battery cells, to generate corresponding one of the plurality of output powers;
   wherein the step of modifying the output voltage levels of the plurality of battery cells to generate the plurality of output powers comprises:
      controlling a first output voltage level of the first battery cell lower than an second output voltage level of a second battery cell when a first status of the first battery cell and a second status of the second battery cell indicates that the first status of the first battery cell is worse than the second status of the second battery cell; or
      controlling the first output voltage level of the first battery cell higher than the second output voltage level of the second battery cell when the first status of the first battery cell and the second status of the second battery cell indicates that the first status of the first battery cell is better than the second status of the second battery cell.

8. The battery management method of claim 7, wherein the statuses of the plurality of battery cells comprise State of Charge (SOC) and State of Health (SOH) of the plurality of battery cells.

9. The battery management method of claim 7 further comprising:
controlling charging of at least one battery cell within the plurality of battery cells according to the statuses of the plurality of battery cells.

10. The battery management method of claim 9, wherein the step of controlling charging of the at least one battery cell within the plurality of battery cells according to the statuses of the plurality of battery cells comprises:
charging the at least one first battery cell when at least one first status of the at least one first battery cell indicates that the at least one first battery cell is not fully charged.

11. The battery management method of claim 9, wherein the step of controlling charging of the at least one battery cell within the plurality of battery cells according to the statuses of the plurality of battery cells comprises:
not charging at least one second battery cell within the plurality of battery cells when at least one second status of the at least one second battery cell indicates that the at least one second battery cell is fully charged.

12. The battery management method of claim 7, wherein the output voltage levels of the plurality of battery cells are modified through Pulse Width Modulation (PWM).

13. A battery management system (BMS) for managing discharging of a plurality of battery cells, comprising:
a battery monitoring unit, for monitoring statuses of the plurality of battery cells;
a discharge control unit, for controlling the plurality of battery cells to output a plurality of output powers to a load according to the statuses of the plurality of battery cells; and
a charge control unit, for controlling connections between an input source and the plurality of battery cells to charge at least one battery cell within the plurality of battery cells with an input power according to the statuses of the plurality of battery cells, wherein the BMS is further used for managing charging of the plurality of battery cells.

14. A battery management system (BMS) for managing discharging of a plurality of battery cells, comprising:
a battery monitoring unit, for monitoring statuses of the plurality of battery cells;
a discharge control unit, for controlling the plurality of battery cells to output a plurality of output powers to a load according to the statuses of the plurality of battery cells; and
a plurality of DC-to-DC convertors coupled to each of the plurality of battery cells, for modifying output voltage levels of the plurality of battery cells to generate the plurality of output powers;
wherein each of the plurality of DC-to-DC convertors modifies corresponding one of the output voltage levels of corresponding one of the plurality of battery cells according to corresponding one of the statuses of the plurality of battery cells, to generate corresponding one of the plurality of output powers;
wherein the plurality of DC-to-DC convertors modify the voltage levels of the plurality of battery cells through Pulse Width Modulation (PWM).

15. A battery management method, for managing discharging of a plurality of battery cells, comprising:
monitoring statuses of the plurality of battery cells;
controlling the plurality of battery cells to output a plurality of output powers to a load according to the statuses of the plurality of battery cells;
modifying output voltage levels of the plurality of battery cells to generate the plurality of output powers, to modify one of the output voltage levels of corresponding one of the plurality of battery cells according to corresponding one of the statuses of the plurality of battery cells, to generate corresponding one of the plurality of output powers; and
controlling charging of at least one battery cell within the plurality of battery cells according to the statuses of the plurality of battery cells.

16. A battery management method, for managing discharging of a plurality of battery cells, comprising:
monitoring statuses of the plurality of battery cells;
controlling the plurality of battery cells to output a plurality of output powers to a load according to the statuses of the plurality of battery cells; and
modifying output voltage levels of the plurality of battery cells to generate the plurality of output powers, to modify one of the output voltage levels of corresponding one of the plurality of battery cells according to corresponding one of the statuses of the plurality of battery cells, to generate corresponding one of the plurality of output powers;
wherein the output voltage levels of the plurality of battery cells are modified through Pulse Width Modulation (PWM).

* * * * *